Aug. 20, 1935.  G. E. HIEBER ET AL  2,012,082
HYDRAULIC GEAR SHIFTING SYSTEM
Filed Aug. 23, 1930  4 Sheets-Sheet 3
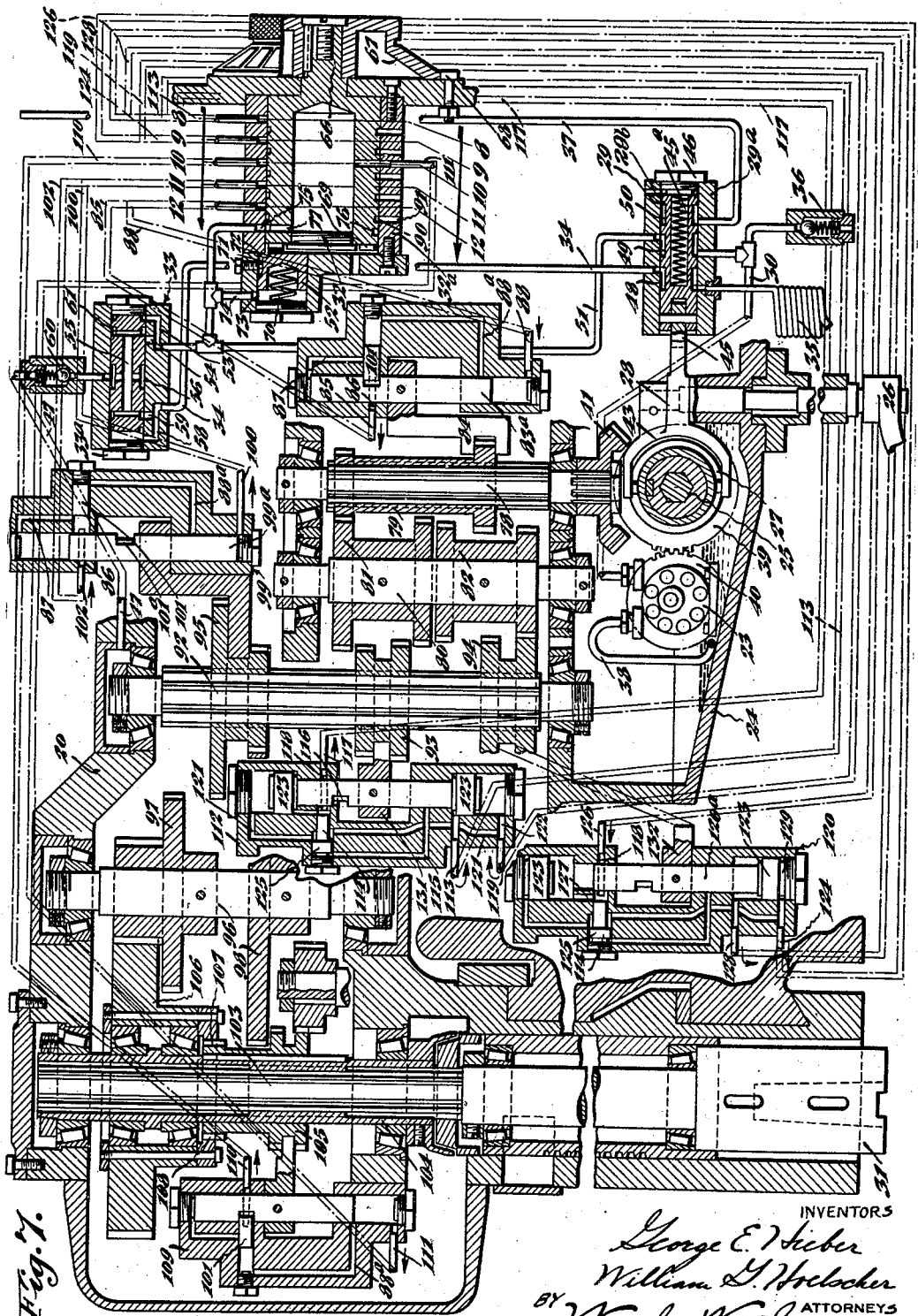
INVENTORS
George E. Hieber
William G. Hrelscher
BY Word & Word  ATTORNEYS Aug. 20, 1935.  G. E. HIEBER ET AL  2,012,082
HYDRAULIC GEAR SHIFTING SYSTEM
Filed Aug. 23, 1930  4 Sheets-Sheet 4
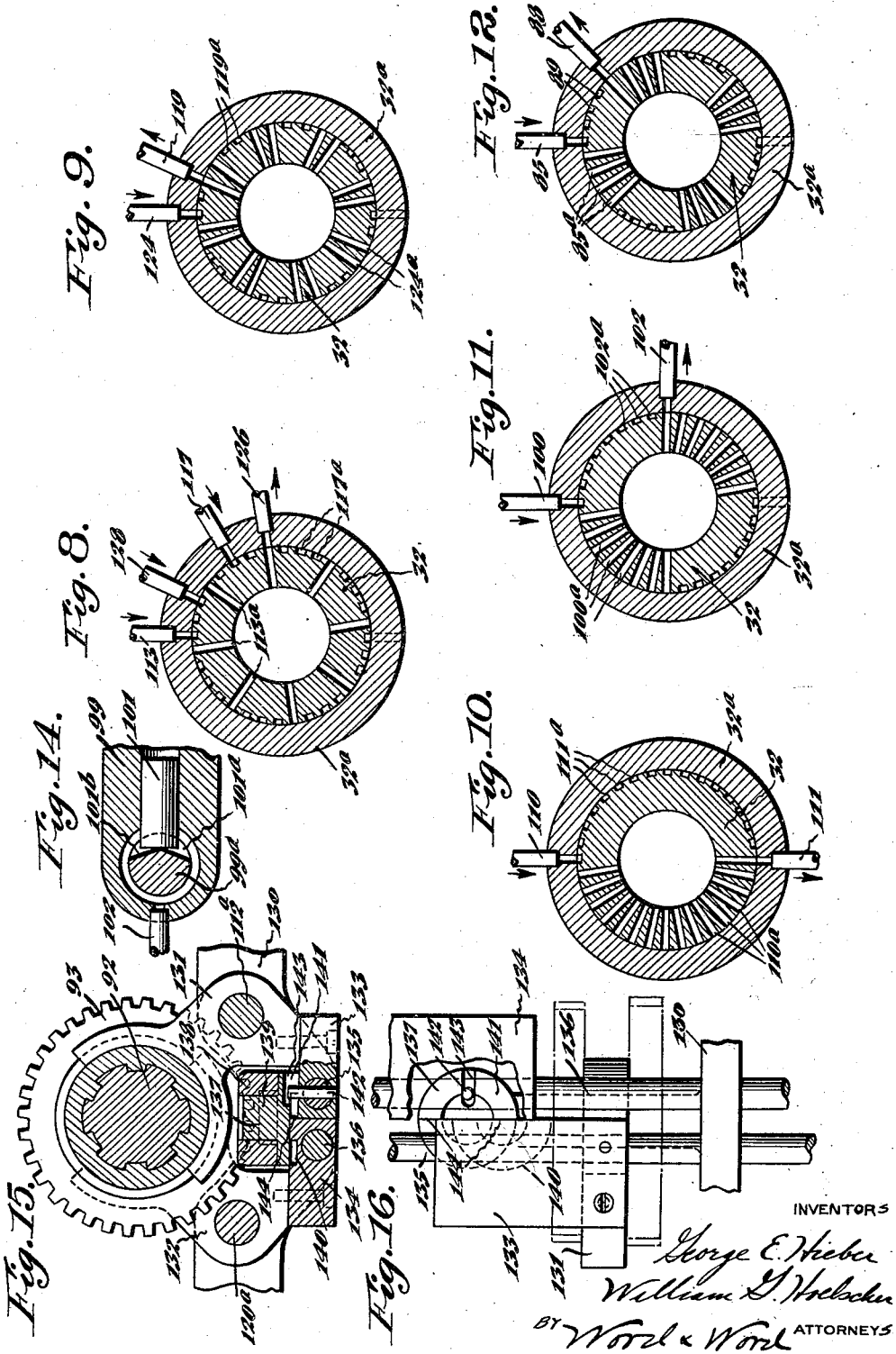
INVENTORS
George E. Hieber
William G. Hoelscher
BY Word & Word ATTORNEYS Patented Aug. 20, 1935

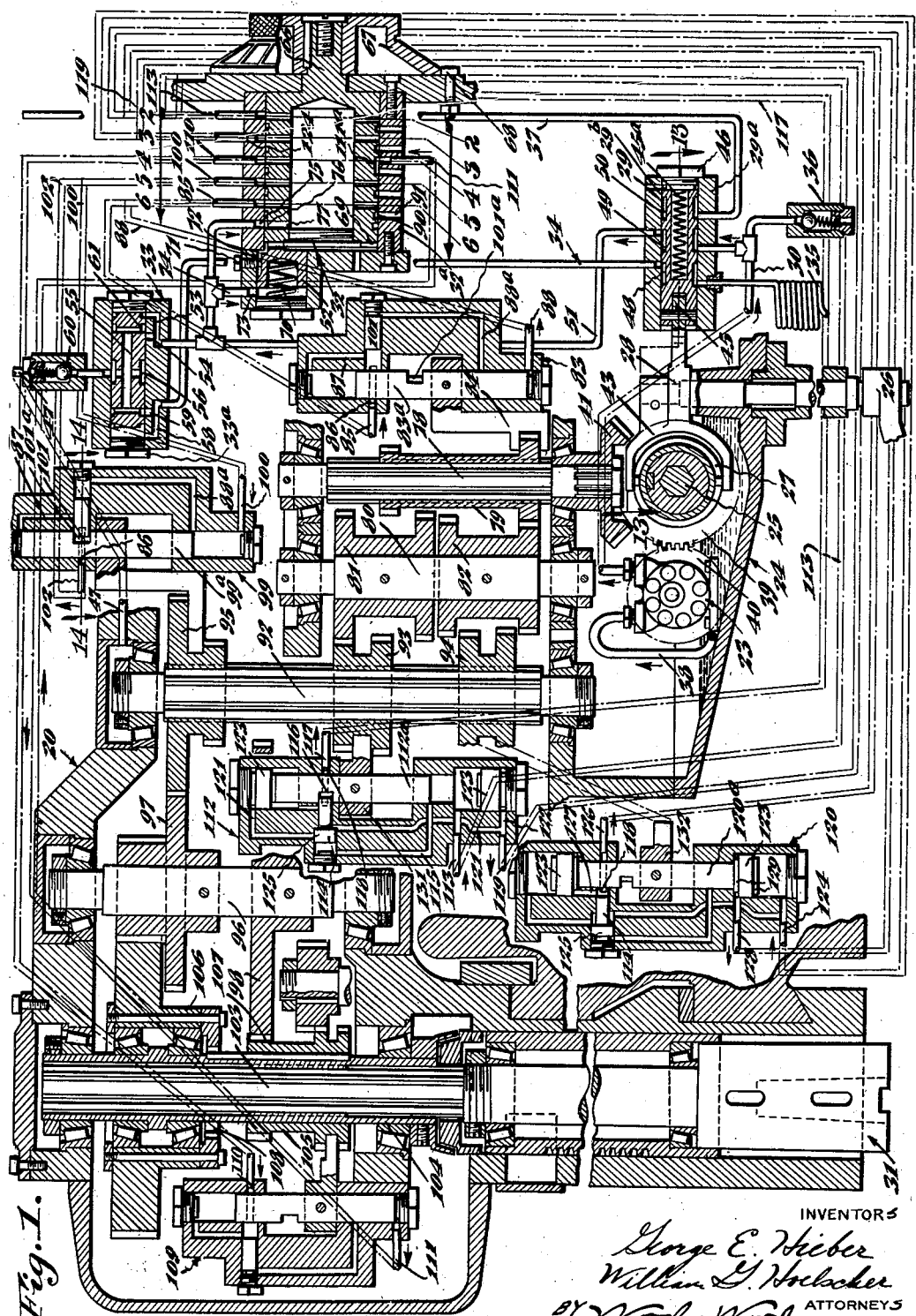

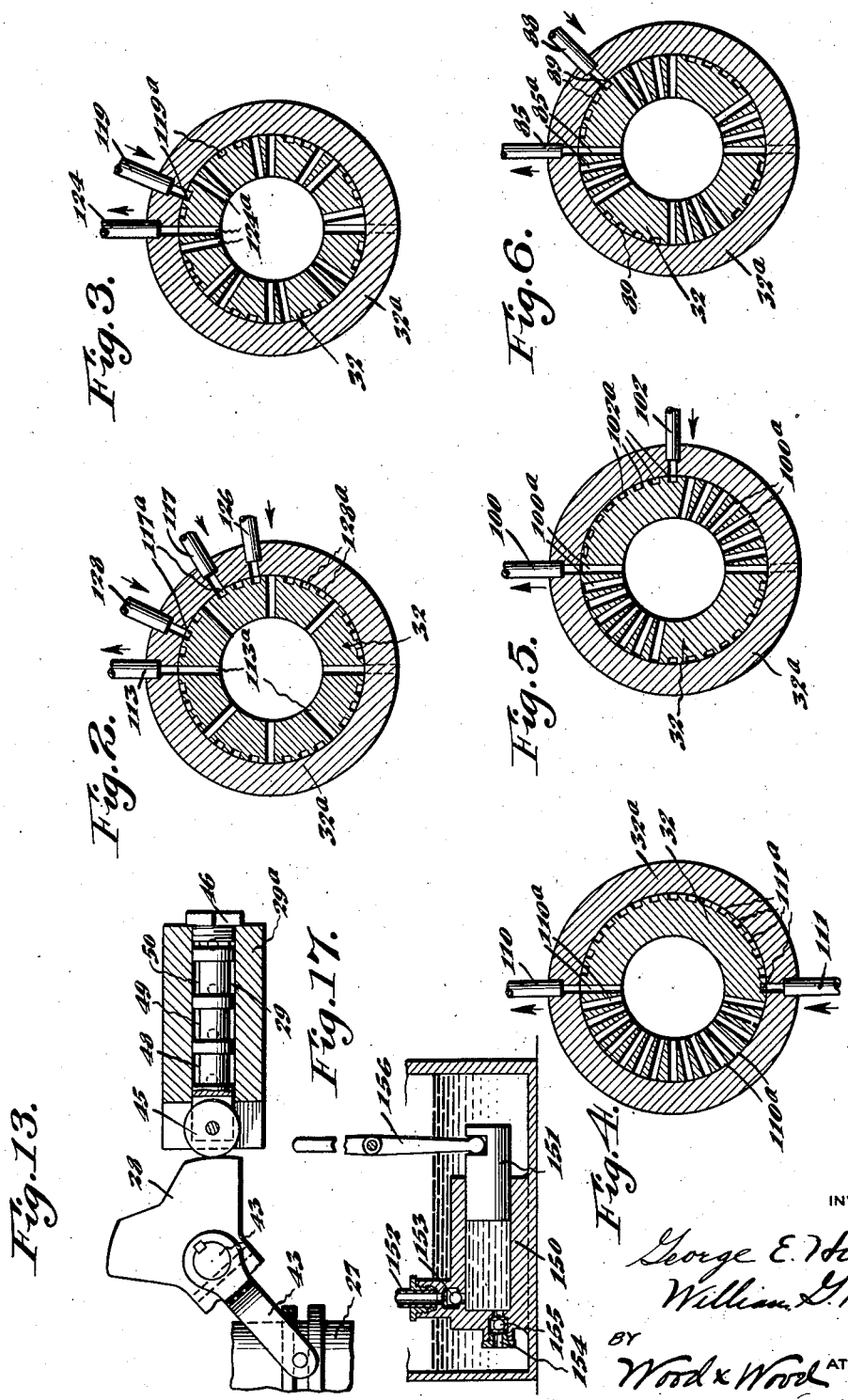

2,012,082

UNITED STATES PATENT OFFICE 2,012,082

HYDRAULIC GEAR SHIFTING SYSTEM

George E. Hieber, Cincinnati, and William G. Hoelscher, Norwood, Ohio, assignors, by mesne assignments, to The Cincinnati Milling Machine Company, Cincinnati, Ohio, a corporation of Ohio Application August 23, 1930, Serial No. 477,274

14 Claims. (Cl. 77—28)

This invention relates to feed or speed change transmissions and is particularly directed to a hydraulic apparatus for shifting the gears of the transmission. The apparatus of this invention may be applied to any transmission regardless of the number of speed changes or the nature of the mechanism to which the power is to be transmitted.

The fluid for actuating the various devices of the apparatus may be applied or placed under pressure by any means developing sufficient power for sliding the gears into mesh. The hydraulic motive power, supplied by the fluid pressure means, is controlled by the clutch shifting and gear reversing lever commonly associated with the main power shaft of the transmission. The selection of the particular gears to be shifted is accomplished by means of a manually adjusted valve controlling the application of the fluid under pressure to any one of a plurality of gear shifting devices located throughout the transmission. It is, therefore, a broad object of this invention to provide an improved hydraulically operated gear shifting apparatus, the various devices of which apparatus may be arranged or disposed throughout any train of gears and applied for any number of gear changes.

It is a further object in connection with the foregoing to provide that the fluid pressure is created within the gear transmission unit and to provide that the control thereof for the application of the created pressure is operated coincidentally with the clutch and reversing gearing shift lever.

The fluid pressure developing means may be of any type conveniently applied within the casing and capable of developing pressure sufficient to move the gears, such as a constantly running pump or an impulse piston manually reciprocated to boost the pressure at the appropriate time. It is desirable in some instances to provide that the fluid supplied under pressure is a lubricating medium such as oil, whereby the flow may be not only to the gear shifting apparatus but to the bearings and throughout the gear transmission casing for lubricating the same. For this reason, it is another object to provide, in a system or fluid flow circuit of normally low pressure which may maintain a lubricating flow to bearings etc., a supply of fluid to the selector valve which controls the application of the fluid pressure to the various gear shifting devices, and to include a choke and relief valve within the lubricant supply line operative for retarding the flow of oil induced by the pump, whereby a high gear shifting pressure may be momentarily developed within the selector valve for a gear shifting pressure impulse. Furthermore, it is an object of this invention to provide that the fluid pressure source as a pump, is not continually operated against high pressure load or great head pressure but only at the time of actual gear change. It is, of course, obvious that the lubricant supply line may be eliminated and the oil may be by-passed back without utility to the reservoir during low pressure flow.

It is another object of this invention to provide a combination of valves arranged in the circuit for definitely controlling the pressure of the supplied oil for the various purposes of the apparatus and for controlling the selection of the particular gear shifting device to which the high pressure impulse is directed.

It is a further object to provide a device for maintaining a constant level of fluid throughout the system over a considerable period of time, so that there can be no failure of fluid pressure, and for maintaining the parts in a definitely set relation.

Another object is to provide an extremely compact and simple selector valve which is easily manually set at an indicated speed change for controlling the passage of the fluid under pressure through the valve, and which also includes a hydraulically operated device for maintaining the valve in each of its set positions against accidental dispositioning. A selector valve for controlling or effecting a great many speed changes, such as 32 in the present instance, necessarily is of multiramose construction, although in the present instance the construction is extremely simple and the number of conduits or connections to the valve and passageways in the valve has been reduced to a minimum. The valve is extremely small and therefore readily incorporated within the gear transmission, the same simplicity and compactness being essentially present throughout the apparatus or system so that the gear transmission casing need be of no greater size than that ordinarily used.

The choke and relief valve inserted in the lubricating line or by-pass is adapted to function automatically to permit flow of fluid therethrough in either position of the control valve, and, upon the clutch valve being initially thrown in and the power source connected with the transmission, is interposed for a moment as a choke in the line for causing the rise of pressure in the selector valve, and thereafter moves against resistance to the opposite or running position for an ultimate flow relief and re-establishing of the flow through the by-passage, the gear shifting impulse occurring during the period of resistance or impedance to movement of the choke and relief valve. This valve is always returned to original or running position by this connection of the main power source.

The present apparatus has ready application to the transmission within the head of a radial drill, and it is, therefore, an object to provide an apparatus for this application or use. Where the shafting mounting the gears is vertically disposed as in the radial drill head, it is necessary to provide some definite means for sustaining the gears in shifted position against the action of gravity in the event of fluid pressure failure. Therefore, it is a further object of this invention to provide hydraulically operated gear shifting devices located adjacent the respective gears to be shifted which include automatically hydraulically operated means positively locking the gears in shifted position. These means may be said to be hydraulically set positions incapable of mechanical disturbance, and their disengagement can only be effected by the hydraulics controlled from the selector valve. Although set by means of fluid pressure, the fluid pressure may be entirely withdrawn and the locking means will continue to maintain the shifting devices in shifted position.

At some point within the transmission for the purpose of simplifying the gear shift independently slidable gear clusters are mounted on the same shaft for intermesh with respective adjacent gear clusters of the train. It is, therefore, another object to provide an interlock between the hydraulically operated devices moving these respective slidable gear clusters for preventing the shifting of one set of gears while the other is in a shifted or meshing position. In other words, it is provided that one shifting device must be in neutral at all times and the shift of the other is dependent upon this condition existing.

Other objects relate to the general construction of the various devices incorporated in the system and apparatus as well as their general arrangement, and these objects and other advantages will be more fully apparent from the description of the accompanying drawings in which:

Figure 1 is a diagrammatic view showing the hydraulic apparatus applied to a radial drill head transmission for varying the speed of rotation of the drill spindle, the view illustrating the apparatus and system in position for imparting the highest speed to the drill spindle.

Figures 2, 3, 4, 5, and 6 are sectional views taken on the respective section lines 2, 3, 4, 5, and 6 on Figure 1, these views detailing the construction of the valve and illustrating the position of the various ports of the valve when the transmission is in high speed.

Figure 7 is a view similar in Figure 1 digrammatically illustrating the system and apparatus, but showing the valve and the gears in position for the lowest speed transmission.

Figures 8, 9, 10, 11, and 12 are sectional views taken on respective section lines 8, 9, 10, 11, and 12 of Figure 7 illustrating the selector valve in detail and showing the disposition of the ports thereof in the low speed transmission.

Figure 13 is a sectional view taken on line 13—13, Figure 1, illustrating the means on the power control lever for coincidentally operating the clutch and shifting the control valve of the hydraulic system.

Figure 14 is a sectional view on line 14—14, Figure 1, illustrating in detail one of the detents which are hydraulically operated for locking the vertically mounted gears in position.

Figure 15 is a sectional view taken through that counter shaft of the transmission which carries the plurality of slidable gear clusters detailing the mechanical interlock for preventing shifting of one hydraulic device when the other is in shifted or gear coupling position.

Figure 16 is a side or front view of the mechanical device illustrated in Figure 15.

Figure 17 is a view of a manually operated reciprocable piston for developing fluid pressure throughout the system and for imparting a gear shifting impulse.

The gear shifting apparatus described in general is applied to an arrangement or train of gears within a casing, which gears may function as speed or feed change gears. The present disclosure illustrates the gear train within the casing 20 of a drill head for driving the spindle of a radial drill for varying the speed of rotation thereof. The various speed changes are accomplished by shifting certain gears, slidably mounted upon splined shafts of the transmission into mesh with other gears of the train in the conventional manner.

A plurality of hydraulically shifted devices are arranged throughout the gear casing 20, each of these devices being connected to respective slidable gears of the train. An oil pump 23 or fluid pressure means is disposed within the drill head casing for drawing oil from a reservoir 24 and pumping the same throughout the system as controlled by the various devices hereinafter set forth. This oil pump may be driven from the main power shaft or any constantly driven shaft. In this particular instance it is driven from the main power shaft 25 upon which the conventional reversing gearing and clutch are mounted.

A manually operated lever 26 is provided for shifting the reversing gear control clutch 27 on the main power shaft. This lever includes a device 28 for operating a main control valve 29 for the system, the functions of which valve will be more apparent as the description progresses. The oil is pumped from the supply to this main control valve 29 through a conduit 30 at all times when the main power shaft is being driven. The control lever coincidentally throws the clutch in for connecting the particular reversing gears on the driving shaft with the gear train or transmission to the drill spindle 31 and operates the main control valve to open the passage for the oil to a selector valve 32. The selector valve is also manually operated for setting the same at the desired indicated speed or control position for applying the fluid pressure to any particular gear shifting device 22.

The conduit 30, leading from the pump to the control valve, is connected through the control valve, with the oil chamber of the selector valve and thence communicates with the particular gear change device through a choke and relief valve 33. The main control valve is also connected through a separate conduit 34, to the choke and relief valve for exhausting the latter and for causing the pumped oil to be delivered through the main control valve and the choke and relief valve to a lubricating system and thence back to the pump reservoir when the transmission is disconnected and the pump operating.

This choke and relief valve 33 is provided for causing the pressure of the pumped oil entering the selector valve to develop to a degree sufficiently high for creating an impulse for shifting the selected gears via connected passageways.

The choke and relief valve has its exhaust conduit emptying through the main control valve into a resistance coil 35 for retarding the movement of the valve as the gear shifting impulse is provided. The retardation of the valve is over a period of time for causing pressure development sufficient to efficiently shift the particular gear, and thereafter the choke and relief valve acts to relieve the gear shifting or impulse pressure by shunting the oil to some other source such as the lubricating system from whence the oil may return by gravity to the pump. The choke or relief valve is suitably ported for causing either the exhaust or the main supply line thereto controlled by the main valve to be connected to the lubricating system.

Therefore, it will be apparent that the pump normally operates at low pressure through the control valve and the choke and relief valve at all times when the main power shaft is being operated independently of the position of the clutch, control valve, or choke and relief valve with the exception of the initial phase of flow when the clutch is thrown in. The necessary high pressure for shifting a gear selected by the position of the selector valve only occurs immediately after the control valve is operated by connecting the main power shaft to the train of gears. This rise in pressure is accomplished by choking the low pressure flow or circuit to the lubricating system at the time that the main supply line or passage to the selector valve is open.

The fundamental purpose of the choke or relief valve is to lower the normal running load on the pump, this being accomplished by causing the pump to produce a gear shifting or high pressure only at the actual time of gear shift. The flow of oil, therefore, from the constantly operated pump, is to the lubricating system alone when the clutch is out. The oil in the selector valve is dead at this time.

When the clutch is in, the flow, to the selector valve and to the choke and relief valve, has two phases of pressure, the first of which is a high pressure gear shifting phase controlled by the resisted choke valve. In the second or low pressure phase, the choke and relief valve functions to relieve or clear the passageway to the lubricating system. The choke and relief valve is shifted by the developing gear shifting pressure at a slow rate of speed so that the high pressure developed by this obstruction in the line shifts the gears in the first phase of valve movement, and as the choke valve completes its movement removing the obstruction in the line, the oil flows through to the lubricating system and the pressure lowers to normal. This low pressure then continues to exist in the selector valve for holding the shifted gears in place until the clutch is thrown out and in again and the control valve correspondingly shifted.

A safety valve 36 may be provided in the main supply line leading from the pump to the control valve to eliminate any hazard because of undue high pressure. The resistance for the choke valve may be in the form of a coil of pipe having a small diameter slowly exhausting the fluid so that the high pressure is maintained long enough to effect the gear shift. The moment the clutch is thrown out the choke valve is returned to normal position because of the action of the control valve in opening communication between the main supply line and the choke and relief valve at the opposite end of the choke and relief valve or the end previously exhausted through the resistance.

The selector valve includes a hydraulically operated detent engaging the rotatable valve element for determining the successive stops of the valve, which stops are indicated on the face plate of the valve for a visual determination of the speed at which the valve is set. The system in this instance includes a selector valve which controls thirty-two speed changes. The fluid is admitted to the interior of the valve and passes through a plurality of radial ports which are selectively aligned with ports in the body of the valve extended through conduits to the appropriate shifting devices.

The present valve is highly efficient and compact in that, for the thirty-two speed changes, it only employs twelve control pipes extending from the selector valve to the various devices, which conduits or lines may be functioning either as feed lines or exhaust lines in accordance with the arranged system as will be fully apparent hereinafter.

In order that the system will not drain over a moderate period of time, a stand pipe 37 is provided extending above the level of the devices of the apparatus, this stand pipe being in communication, through the control valve, with the selector valve and any particular gear shifting devices which happen to be functioning at the time. The various gear shifting devices include plungers which are operated in either direction for shifting the gears into the one of two positions desired. Certain of the gear shifting devices are designed to control the shifting of particular gears into three positions, the intermediate of which is a balanced or unmeshed position for the gears.

Furthermore, particularly in the instance of vertical shafts, the gear shift devices include hydraulically operated means positively engaging the shift devices for locking the gears in upper position to prevent dropping of the gears in the event of fluid failure, which would be detrimental either in case the transmission is in operation at the time or if the transmission is not in use would cause damage to the gears if the transmission were started up without inspection thereof.

In the instance where two clusters of gears are shifted on the same shaft alternately by corresponding hydraulically operated gear shifting devices, a mechanical interlock is provided between these devices for preventing the meshing of one cluster of gears when the other cluster is in mesh. The transmission casing and arrangement of gears therein is of no consequence in the present application since the invention is primarily directed to the system and apparatus for shifting gears rather than to the mounting of the gears.

Referring specifically to the drawings, the pump 23 is secured in the extreme lower region of the transmission casing within the compartment or reservoir 24 thereof. An intake pipe 38 is provided for the pump which pipe extends into the fluid pool within the compartment. The main power shaft 25 is journalled within the casing and the pump is located adjacent this power shaft. The main power shaft being a constant speed shaft, a gear 39 is provided thereon in mesh with the gear 40 operating the pump. This main power shaft may carry any conventional set of reversing gears and clutch.

Bevel gears (not shown) mounted on the power shaft are alternately connected to the power shaft and transmit the drive through bevel gear 41 in mesh with both of the reversing gears. The bevel gear 41, which is in mesh with both the reversing gears, is connected to one end of a shaft of the transmission which is the first shaft in the train of gearing and shafting leading to the spindle. The details of this reversing gear mechanism are not disclosed for the reason that it may be of any standard construction.

The lever 26 is mounted in the transmission casing or head of the radial drill, this lever being mounted upon the lower end of control shaft 42 carrying a yoke 43 on its upper end operating the clutch 27. This yoke element includes the device 28 for operating the control valve in the nature of a cam portion extending in the opposite direction from the fork. This cam is segmental providing two high surfaces generated on a radius taken on the control shaft axes and an intermediate low portion. This cam is in engagement with the outer end of the main control valve plunger 29.

The engagement is accomplished by means of a roller 45 mounted in the outer and bifurcated end of the slide valve 29. This valve 29 is spring urged against the cam by means of a spring 45ᵃ under compression between the bottom of a socket therein and a closure screw 46 secured in the opposite end of the valve body. The control valve accomplishes the following fluid communications.

In normal position with the clutch thrown out and the spring effective for moving the plunger outward in engagement with the low spot of the cam, the pump 23 is connected directly to the choke and relief valve and thence through the lubrication line or conduit 47. This is a low pressure condition during which the pump is not laboring but is forcing oil through an open system returning the oil to the reservoir through the various bearings of the transmission or through a direct return or by-pass. Another fluid communication which is effected at this time is that the stand pipe 37 is in communication with the selector valve for maintaining a solid presence of fluid in the selector valve and in the particular gear shifting devices in operation at the time.

When the clutch is thrown in and the gear transmission is being operated, the main supply line 30 from the pump is in communication with the selector valve and with the choke and relief valve, which communication initially actuates the choke and relief valve. The exhaust end of the delay valve is opened at this time through the control valve to the resistance pipe 35 slowly exhausting the fluid from the rear end of the choke and relief valve 33.

These various communications established between the piping of the system are accomplished by the following groove and port arrangement in the main control valve 29 and its body 29ᵃ. The plunger or slide valve 29 includes three annular grooves 48, 49 and 50, spaced along its longitudinal extent. Each of these grooves is of substantial width for effecting continual communication with certain of the respective ports located in the same side of the control valve body. The first of these ports toward the cam engaged end of the plunger has the resistance pipe 35 connected thereto.

This port for the resistance pipe communicates with the alternate supply and exhaust pipe 34 extending to the choke and relief valve, this pipe 34 being connected to the control valve at the diametrically opposite side from the resistance pipe port. The communication between this exhaust pipe 34 and the resistance pipe is established through the first groove 48 of the plunger when the transmission is in operation and the plunger depressed.

The supply line or conduit 30 from the pump is connected at all times with a second annular groove 49 of the control valve. At the opposite side, the main supply line continues to the choke and relief valve and the selector valve, this extension 51 of the supply line being in communication with the groove 49 through a port in the body only when the plunger is depressed and the transmission is in operation. This central groove 49, which is constantly in communication with the supply line 30 from the pump, alternates in position of communication with the supply line continuation 51 and with the alternate supply and exhaust line 34, which respective lines lead to the respective ends of the choke and relief valve. A vent 29ᵇ is provided at the rear end of the control valve body for relieving that end of the piston cylinder against the effects of suction. The third groove 50 is constantly in communication with the stand pipe 37 through an appropriate port in the body. When the plunger is in released position or position of rest with the transmission, the groove 50 opens communication between the stand pipe and the supply line continuation 51 to the choke and relief valve and with the selector valve so as to maintain the previously described fluid supply or body within the selector valve and the particular connected shifting device.

The main supply line 51 extends to the selector valve and to a hydraulically operated detent 52 for the selector valve, the flow of the fluid from the selector valve to the particular shifter device being accurately maintained by this detent. The supply pipe continuation 51 is also connected to the body of the choke and relief valve 33. The port in this valve 33, to which it is connected, is forked, one of the passageways thereof, namely 53, extending to the valve cylinder at the head end of the plunger and the other opening 54 to a side of the plunger and adapted to communicate through radial ports with a central passageway 55 of the plunger and then with an annular groove 56 of the plunger, which groove is always in communication with the return or lubrication line 47.

With the choke and relief valve plunger in normal position, or just at the time of shift as shown in the drawing, the main supply line is connected with the head end of the choke or relief valve cylinder and body. As the pump forces the fluid through the central annular groove 49 of the control valve, the fluid passes both into the selector valve and into the head end of the choke and relief valve, the selector valve having previously been set to open communication to the appropriate shifting devices. The rear end of the choke and relief valve at this time is connected to the resistance coil through one fork 58 of a forked passageway or port for the alternate exhaust and supply pipe 34. Therefore, the fluid pressure rises as the valve moves slowly against the resistance afforded by the resistance coil. When it reaches the positive abutment provided by a closure screw 33ᵃ in the end of the choke and relief valve body, the second fork 59 of the supply pipe is connected to the interior passageway 55 of the valve for opening or relieving the fluid flow through to the return or lubricating line.

This position, effected after the gear shift has been accomplished by the rise in pressure through the selector valve, is maintained until the clutch is disengaged and the control valve returned to normal position. The return of the control valve to normal position establishes communication between the main supply pipe from the pump and the alternate supply and exhaust pipe 34, closing off the supply to the head end of the choke and relief valve by removal of the central annular groove 49 from communication with the pipe 34. Thereupon, the fluid flow is directed to the rear end of the choke and relief valve moving the valve quickly back to a reverse position and exhausting or displacing the fluid at the head end of the choke valve piston out through the stand pipe.

With the choke and relief valve returned to normal position when the transmission is idle, communication is established from the alternate exhaust or supply line 34 through the forked passageway thereof through the interior passageway of the valve plunger and through the central annular groove thereof for return through lubrication line. The lubrication or return line includes a pressure control valve 60 opening to pressures from the choke and relief valve and closing when the pump is idle for maintaining a solid supply of fluid within the shifting system.

The specific construction of the choke valve plunger or piston for the aforesaid connections includes three annular grooves, the outer groove 61—61 of which respectively communicates with forks 58, 59, of the inlet passageways of the supply lines at the respective ends of the choke and relief valve body and the intermediate groove 56 constantly registering with the lubrication line. All of these grooves are interconnected at all times by radial ports and the central passage 55. Only one of the connections of the lubrication line to a bearing of the transmission is shown herein although it will be appreciated that any number may be provided.

The selector valve 32 is of hollow rotatable type mounted in a body 32ª and a hollow rotatable valve element. This valve body is affixed to the inner wall of the casing and the valve includes a shank 66 extending through the wall to the exterior thereof and carrying a manually operable indicator knob 67. The present system includes 32 speed changes so that 32 speeds are indicated (not illustrated) around the periphery of the knob for registry with a stationary indicator element 68 adjacent the periphery. For each of these different speed indications, the valve has a corresponding aligned notch 69 in its opposite end, which notches are engageable by the hydraulically operated detent.

The valve body is hollow providing a chamber for distributing the fluid to the appropriate shifting devices. The detent is urged by means of a spring 70 as well as hydraulically urged into registry with the teeth and is maintained against rotation by means of a set screw 71 engaging a longitudinal slot 72 therein for maintaining registry of a radial port 73 extending from the hollow interior of the detent, with a fluid supply line 74 extending from the main supply line 51. The detent is subjected to the normal running or low pressure of the pump when the control valve has been shifted and the clutch thrown in for connecting the power to the transmission. This positively hydraulically locks the detent in engagement with the appropriate adjacent notch, for a particular gear shift, to prevent accidental displacement thereof when the gears are moving.

When the control valve is released and the transmission idle, the detent fluid chamber is in communication with the stand pipe through the groove 50 of the control valve permitting easy displacement of the fluid and relatively easy turning or resetting of the selector valve since the detent is only resisted by the spring. The constant supply connection to the selector valve is through a radial port 75 in the body thereof communicating with an annular groove 76 in the valve element and a radial port 77 in the valve element extending to the interior chamber thereof.

The supply ports to the respective shifting devices are disposed in novel circumferential relation in five sectional planes taken transversely through the valve as indicated in Figures 2 to 6 inclusive of the drawings. The fluid supply is always present in all the ports but the flow through these ports is controlled by the position of the valve relative to certain other stationary ports in the valve body for the various conduits to the shifting devices. These stationary ports in the valve body function both as supply and exhaust ports. When they function as exhaust ports the return is not into the interior of the valve element but is controlled by grooves in the outer peripheral surface thereof, which grooves establish communication to the exterior of the valve and return the fluid back into the transmission casing and the reservoir for re-use for the reason that the valve is contained within the transmission casing.

For the purpose of progressing to a better understanding of the port arrangement within the valve and the circuit of the fluid flow to the shifter devices, a high speed transmission shifted position is illustrated in Figures 1 to 6 inclusive.

The first counter shaft 78 of the transmission of the one upon which the bevel gear 41 driven by the reversing gears is mounted, is a splined shaft. A gear cluster 79 is slidably mounted upon the splined shaft and includes two gears. The next transmission shaft in the gears train is a plain shaft 80 to which two gear clusters 81, 82 are pinned, each cluster including two gears. Therefore, from the first to the second shaft, it is possible to make two changes in speed through the slidable cluster 79.

The gear cluster on the splined shaft is shifted by means of a shifting device 83; this shifter device being exemplary of all those shifting devices in the system which only shift into two positions. This device includes a piston plunger 83ª carrying the yoke 84 engaging the cluster. This plunger is mounted within a ported body and functions as a valve in certain phases of its movement. In the high speed position shown, the largest gear of the cluster 79 is in mesh with the smallest gear of the two clusters on the shaft 80. The plunger is in lower position so that the hydraulic safety detent of the shifter device is not functioning. The fluid supply circuit from the selector valve, at this time, is through a conduit 85 connected to a port in the selector valve body lying in the sectional plane indicated in Figure 6 of the drawings.

This supply conduit 85 extends to the shifter device body, entering an annular groove 86 encircling the plunger and communicating with the detent cylinder at the inner end of the detent and thence through a passageway 87 extending to the cylinder at the upper end of the plunger. Therefore, the fluid pressure at this time is holding the detent out and holding the plunger down. The exhaust from behind the detent has been through a passageway 88ª extending from behind the detent to the opposite end of the plunger cylinder, the plunger being above the entrance of the passageway prior to the present shifted position for permitting exhaust therethrough and through a conduit 88 communicating with this cylinder and extending to the selector valve body. This conduit communicates with an exhaust groove 89, which groove extends longitudinally in the outer periphery of the valve element into communication with an annular exhaust groove 90 lying alongside of the plane of Figure 6, which constantly communicates with a port 91 extending to the exterior of the valve body. This exhaust passageway arrangement is exemplary of that used for all the exhaust conduits. The longitudinal grooves similar to 89 are shown in the transverse sectional views and the annular grooves similar to 90 are best shown in Figures 1 and 7.

This position of the shifter device represents the highest speed possible between the two shafts described thus far. It is necessary to the gear shaft arrangement to maintain this position on the shifting device for four speed changes successively then to mesh the small gear in the cluster on the shaft 78 with the large gear in the upper cluster on the shaft 80 for the next four succeeding gear changes and to thereupon return the large gear into mesh with the small gear etc. This is accomplished by having the described effective supply line 85 successively register with four supply ports 85ª in the valve (see Figure 6) and the exhaust line 88 to communicate with four exhaust grooves 89 successively.

The next or intermediate shaft in the train is a spindle shaft 92 mounting two independently slidable gear clusters 93, 94, each of which includes two gears. Each of the four gears thus mounted on this shaft is aligned for mesh with a particular component gear of the four gears on the preceding shaft. By placing two shiftable clusters on the third shaft of the train, it is possible to reduce the number of shafts necessary to accomplish the 32 speed changes present herein.

The third shaft 92, therefore, may be driven at eight different speeds through this three shaft arrangement. The first shaft drives the second shaft at two speeds and by the four gear ratio variation between the second and third shaft, each of these first two speeds may be converted into four. The description of the gear shifting devices for these two gears which includes a mechanical interlock will be described later.

The third shaft 92 also carries a third shiftable gear cluster 95 of two gears. The next shaft in the gear train is a plain shaft 96 upon which shaft one gear cluster 97 and a single gear 98 are pinned. The gear cluster 97 including two gears has its large gear in mesh with the large gear of the upper cluster 95, on the third or splined shaft, when the transmission is in the high speed now being described. The shifting device 99 for controlling the shifting of this third cluster 95 on the third shaft is of the same structure as the shifting device previously described. The position, however, is varied for the high speed from that of the preceding shifting device. This shifter device is controlled from ports in the sectional plane of the selector valve shown in Figure 5. The plunger is held in upper position and being a vertical plunger controlling a vertically mounted gear cluster, the hydraulic safety detent is in operation at this position.

The fluid supply to this shifter device is through a supply port 100ª in the control valve (see Figure 5) then through a conduit 100 extending to the lower end of the shifting device body or cylinder. Fluid supply to this cylinder raises the plunger 99ª effecting the gear shift and at the moment that the shift is fully effected, the plunger opens communication to the passageway 88ª extending to the rear of the detent 101 thus forcing the detent into a transverse notch 101ª in the plunger which is exactly oppositely disposed at this position. With the detent within the groove, fluid failure may occur behind the detent or below the plunger without disastrous results for the reason that the displacement pressure or gravity acting on the detent is directed at right angles against the detent and no displacement can occur.

The exhaust of the opposite or upper end of the shifter device takes place through the detent return passageway 87 extending to the upper end of the cylinder of the shifter device. It will be seen that prior to the quick setting movement of the detent, this passageway is open to the conduit 102 extending to the sectional plane of Figure 5 via the forward end of the detent chamber, then through the annular groove 86 about the plunger to exhaust groove 102ª thence through the particular annular exhaust groove to the exterior of the valve. It will be apparent that the moment the detent is actuated, exhaust for the upper end of the plunger cylinder is no longer necessary and the interruption thereof is of no consequence (see Figure 1).

The detent must always be hydraulically removed from its effective position. This is done by the use of the upper conduit 102 as a supply conduit, the conversion being effected by the selector valve. The fluid flows through the annular groove into the notch 101ª, which notch has a V-shaped base 101ᵇ providing a line engagement with the detent so as to permit ingress of fluid within the notch and against the head of the detent for moving the detent back and out of position (see Figure 14). The detent at this juncture constitutes a valve which must be displaced from effective position to open fluid supply or communication to the upper cylinder of the shifter device.

The selector valve in controlling this shifter device 99 includes a grouped arrangement of supply ports and exhaust ports which is as follows. For the next eight successive positions of the selector valve the described position of the shifter device 99 for meshing the large gear of the upper cluster on the third shaft will occur since there are eight successive supply ports 100ª (see Figure 5) and the exhaust appropriate thereto will also occur because of the eight successive exhaust ports 102ª. Then for eight succeeding positions this arrangement will be reversed etc. The reason for this arrangement of ports will be more fully apparent as the description progresses.

Through the third cluster 95 on the third shaft 92 of the transmission, which cluster alternately meshes with a single gear 98 and the large gear of the gear cluster 97 on the fourth shaft, the speed changes are doubled again and therefore it is possible to impart sixteen speeds to the fourth shaft.

Beyond the fourth shaft is another splined shaft 103 which carries the spindle 31 on its lower end. This fifth shaft carries a sleeve 104 and a gear cluster 105 is slidably keyed to the sleeve so that the drive for the fourth shaft is obtained through this gear cluster to the sleeve and thence to the spindle shaft. The drive to the last mentioned gear cluster may either be from the single gear 98 on the preceding plain shaft or from the gear cluster 97 on the preceding shaft through a gear 106 loosely rotatably mounted on the sleeve of the fifth shaft and drivingly connected to the fifth shaft by means of intermesh of a gear 107 of the cluster of the fifth shaft with an internal gear 108 formed in the loosely mounted gear. The loosely mounted gear is held stationary against longitudinal or axial movement, whereas the gear cluster is shiftable. This gear cluster on the fifth shaft is shifted by means of a shifting device 109 exactly like those previously described.

In the high speed connection shown in Figures 1 to 7 inclusive, this shifting device is in its lowermost position or a position which corresponds identically with the position of the first described shifting device 83 controlling the gear cluster on the first shaft of the transmission. The control pipes for this shifting device extend to the sectional plane of the selector valve, seen in Figure 4 of the drawings, the supply pipe 110 being connected through its supply port 110ª to the interior of the valve and the exhaust pipe 111 being connected to the exterior of the valve through an appropriate exhaust groove 111ª similar to those previously described.

In the instance of the control for this shifter device, the supply pipe shown connected is similiarly connected for the next sixteen settings or speed changes of the transmission due to the provision of sixteen successive supply ports 110ª and the exhaust connection is correspondingly maintained through the provision of sixteen successive exhaust ports 111ª. Thereupon for the next sixteen speed changes the condition is reversed. The drive in this position of the shifting device takes place through the single gear 98, through the cluster 105 to the spindle sleeve.

At this fifth or spindle shaft it is possible to either drive through the cluster 97 on the fourth shaft 96 to the loosely mounted gear thence by way of the internal gear connection to the cluster 105 or to drive through the single gear on the fourth shaft in direct connection with the cluster on the fifth shaft as shown in Figure 1. Therefore, the sixteen changes in the fourth shaft may be doubled at the spindle shaft and thirty-two speed changes accomplished.

Two shifting devices 112, 120, are used for shifting the clusters 93, 94 on the third shaft which is the intermediate or central shaft of the transmission. Each of these shifter devices have their respective plungers connected to a respective gear cluster 93 or 94 by means of forks similar to those previously described for the remaining shifting devices. The primary difference between the two shifting devices now being described is that they are shiftable into three positions, two of which positions are gear meshing positions and the intermediate of which is a neutral position. For this reason the plungers are controlled in an entirely different manner.

For the purpose of the high speed transmission connection, shown in Figure 1, the uppermost gear cluster is moved to mesh the smallest gear thereon with the largest gear on the preceding shaft whereas the lowermost gear cluster is in neutral or unmeshed position. In this position the plunger 112ª of the upper gear shifting device 112 is elevated. The conduits for controlling these two shifting devices extend from the sectional planes of the valve indicated in Figures 2 and 3. For the shifting device effecting the gear shift or gear connection, a conduit 113 extends from the sectional plane of Figure 2 of the selector valve for the supply to the cylinder below the plunger 112ª, this conduit being connected to the interior of the valve through an appropriate supply port 113ª. The fluid pressure flow is into the lower cylinder of the shifting device moving the plunger 112ª and carrying the gear into mesh. When the gear has been meshed, the plunger has moved to clear or open communication between the cylinder and the chamber at the rear of a hydraulic detent 114 through a passageway 115, the fluid pressure then being exerted behind the detent and moving the same into the adjacently disposed slot or notch 116 of the plunger.

Two other conduit connections to this shifting device are provided for properly exhausting the same at this time. One of these, namely 117, extending to the sectional plane of Figure 2 of the valve, permits exhaust from the bore in front of the detent through an annulair groove 118 about the plunger adjacent the detent so that the detent may be set within the groove, this exhaust taking place through the selector valve body through an appropriate longitudinal groove 117ª. The other exhaust conduit 119 is connected to the upper cylinder of the shifter device via a passageway 121, through the detent cylinder and thence to an exhaust groove 119ª of the selector valve in the sectional plane of Figure 3. Another exhaust line or passageway 122 connects to this conduit at the extreme lower end of the cylinder below the plunger for the following purpose.

The plunger control cylinders at the respective ends of the plunger each include a floating piston 123 which may be termed balancing pistons. This latter conduit 119, at this time, exhausts the region below the lower floating piston, and the region above the upper floating piston.

The other shifting device 120, identical to the one just described, engages the second cluster of gears on the intermediate or third shaft and is in balanced or neutral position at this time. Balancing of the plunger 120ª for maintaining the same in intermediate position is accomplished by introducing fluid pressure above and below the respective balancing pistons and exhausting the opposite regions adjacent these balancing pistons. Therefore, a conduit 124 extends from a supply port 124ª second in the sectional plane of Figure 3 of the drawings of the selector valve to this shifter device 120 and is connected through the passageways 121, 122; passageway 122 extending to the lowermost point of the lower cylinder below the balancing piston, and the other 121 extending through the detent cylinder to the extreme upper region of the upper cylinder above the upper balancing piston.

Prior to this balanced condition (assuming the shifting device 120, presently considered, to have been in uppermost position) the detent thereof was forced from the notch in the plunger by the application of fluid pressure, through the described conduit 124 extending to the respective balancing pistons, through passageway 121 to the inner side of the head 125 of the detent, permitting the fluid pressure to pass around the detent for the aforesaid balancing function.

The fluid below the upper balancing piston is exhausted through a conduit 126 extending to the selector valve from an annular groove 118 surrounding the plunger adjacent the detent. This annular groove is connected to the upper cylinder below the balancing piston by a passageway 127 extending parallel with the plunger to the detent chamber. The fluid above the lower balancing piston is exhausted out through another conduit 128 extending to an exhaust port 117a in the sectional plane of Figure 2 of the selector valve. This last exhaust also includes the cylinder housing the plunger at its lower end since to neutralize or balance the piston or plunger it is necessary for the balancing pistons and plunger 120a to move simultaneously into engagement, the upper balancing piston accomplishing the downward movement of the plunger and the fluid pressure being exerted under the lower balancing piston to raise the same. These balancing pistons move between defined limits represented by the ends of their respective cylinders and in balanced position; each engages the respective adjacent ends of their cylinders and the opposite ends of the plunger. The balancing pistons have their ends annularly grooved as at 129 at the corners to provide ingress for the fluid when the pistons are against the ends of their cylinders.

In order to prevent accidental shifting, due to oil failure, of one of the gear clusters 93, 94, on the intermediate shaft 92 when the other cluster is in mesh, a mechanical interlock is provided which is associated with the respective shifting devices 112, 120, controlling these clusters. The shifting devices are located about the intermediate shaft at circumferentially spaced positions as it will be seen by the indication of the respective plungers 112a and 120a thereof in Figure 15 of the drawings. These shifting devices are mounted upon a bracket 130 supported within the casing (the support means not being shown herein).

The shifting yokes 131, 132, which are keyed to the respective plungers 112a, 120a, each carry control plates 133, 134. These plates are bolted at their upper and lower ends respectively to the respective yokes. Slide rods 135, 136 are secured longitudinally through the plates and are slidably mounted in the bracket 130 for the shifter devices. The plates carried by the respective shifting yokes have adjacent edges in slidable contact. The interlock element co-acting with these plates is in the form of a rotatable disc 137 mounted in a vertical rib 138 of the support bracket. This interlock element includes a trunnion 139 for the aforesaid mounting.

The rear of the control plate 134 includes a semicircular groove 140, the center of which lies on the adjacent edges of the respective plates. The disc includes a semicircular rib 141 also taken on a center registering with the abutting edges of the plates, this rib being of the same dimensions as the aforesaid groove for registry therewith. The disc is connected to the other plate 133, the connection being by means of a pin 142 extending through the plate and its guide rod and projecting from the rear thereof into a radial slot 143 in the interlock disc. Therefore, reciprocation of the plate 133 as brought about by the hydraulically operated shifter yoke, rotates the interlock disc when there is no interference. However, it is provided that the ends 144 of the semicircular lug or rib which lie upon a diametrical line, abut the adjacent face of the unattached or adjacent plate.

The only point at which rotation of the disc is possible, due to this abutment, is that point where the semicircular rib and the semicircular groove are concentric. Then the rib is free to rotate through the groove. This position, wherein the centers register, represents a position for the plates wherein both the shifting devices are in neutral position. The position shown in Figure 16 of the drawings is representative of a position of gear transmission wherein one of the shifting devices is in position for meshing gears since the centers of the rib and groove are out of registry.

The yoke 132 at the left hand side of the view has been shifted downwardly from a neutral position to mesh appropriate gears. At this point, it is impossible to move the other shifting yoke since its plate is connected with the rotatable disc and the rotatable disc is held against rotation by the abutment of the ends of its rib with the side face of the shifted plate. Therefore, before this locked plate 133 can be shifted from its neutral position, it is necessary to raise the other plate by an appropriate shift of the shifting device to neutral for registering the centers.

The same thing will occur when the plate 134 or yoke 132 at the left hand side of the view is raised to carry its groove center above the center of generation of the rib. Thus it is impossible to cause mesh of both gear clusters with their component gears simultaneously. For example, assuming both the shifting devices to be in neutral, if there should occur a fluid failure it is obvious that the hydraulic detents will not function to prevent falling of the gears and intermesh of both clusters with their companion or component gears. This, however, cannot occur for the mechanical device just described would necessitate that either one or the other of the plates take preference for movement; that is to say, either the rib must move within the semicircular groove to permit movement of the plate connected to the ribbed disc, or the other plate must move to carry the center of generation of its groove out of registry with the center of generation of the rib of the disc.

The successive positions of the selector valve accomplish the following settings or arrangements of the shifter devices for the various speeds of the transmission. This description is given of the intermediate positions of the selector valve and gears preparatory to an understanding of the extreme low speed of the transmission as represented in Figures 7 to 12 inclusive.

As will be apparent from the sectional view of the valve, as shown in Figure 6, and the preceding description, the gear cluster 79 on the first shaft 78 of the train is maintained in a given position meshing one gear thereof for four successive settings of the selector valve and thereupon it is shifted for meshing its other gear for the next four succeeding shifts.

During the first four shifts starting from the extreme high speed, the shifting device controlling the uppermost cluster 95 on the intermediate shaft 92 is stationary as will be apparent from Figure 5 illustrating the sectional plane of the valve wherein the ports are located for controlling this shifter device. The successive arrangement of the supply ports 100a and exhaust ports 102a is such that this shifted position will be maintained for eight successive valve positions or speed changes, but for a consideration of the same with the shifting movements of the gear cluster on the first shaft, only the first four of these changes will be regarded.

Passing through the gear shifting devices for moving the other two clusters on the intermediate shaft, it will be apparent that the shifting device 109 moving the gear cluster on the spindle shaft will also maintain its position for the next four succeeding settings of the selector valve being capable of maintaining the position for the next sixteen settings as is apparent from the successive arrangement of supply ports 110ᵃ and exhaust ports 111ᵃ in the sectional plane indicated in Figure 4.

While these four successive settings of the selector valve are being made, the three mentioned shifting devices will therefore be stationary for maintaining the original position. The various speed changes during this time will be accomplished by the pair of shifting devices 112, 120, acting on the gear clusters 93, 94 of the intermediate shaft 92. The first position of these four has been described. The next succeeding change effected by the porting in the planes represented by Figures 2 and 3 will be to shift the upper cluster 93, which is in mesh, into its other position which represents a slightly slower speed. To this end, the shifting device 120, which is in neutral or balanced position, is also maintained in position by the relation of the supply ports 124ᵃ and exhaust ports 119ᵃ in the plane of Figure 3 which control the balanced position of this shifting device 120; that is to say, two supply ports 124ᵃ register successively with the supply conduit to the balancing chambers of this shifter device while two exhaust ports 119ᵃ register successively with the exhaust conduit on this shifting device. Therefore, for the four successive positions now being considered, the first two settings balance the shifting device 120 and the next two, reversing the ports, balance the shifting device 112.

The arrangement in the plane of Figure 2 provides three exhaust ports 117ᵃ between each supply port 113ᵃ. The conduit 113 leading from the lower end of the shifting device 112, being actuated for this second setting, registers with an exhaust conduit 117ᵃ and the detent displacing conduit 117 is connected to a supply port 113ᵃ thereby permitting the gears to move into lower position. At the next or third position, the position of the lower shifter device 120 is changed and the previously operating shifting device 120 is moved to balanced or neutral position.

It will be apparent that the ports disclosed in Figure 3 control only the balancing conduits 119, 124, reversely exhausting and supplying the same after each two succeeding settings of the selector valve. Therefore, the third setting results in a reversal of the balancing of these shifting devices 112, 120, and the lower of these shifting devices 120 is then moved to shift its gear cluster 94.

The conduits which control this lower device 120 now function as follows: a supply port 113ᵃ of the selector valve registers with the conduit 128 which supplies the fluid to the underside of the plunger raising the gear cluster to mesh its upper gear and also operating the detent. The other conduits 124, 126, are then connected to exhaust ports 117ᵃ.

For the fourth position the ports in the balancing plane arranged in pairs do not effect the position of the upper shifter device and the shift is again effected on the lower shifting device, the action merely being to reverse the supply to the other end of the plunger through conduit 126 connected to port 113ᵃ. Thus the four mentioned speed changes are made solely by means of the pair of gear clusters on the intermediate shaft.

Now it occurs that upon the fifth shift starting the next four shifts, the first shifting device controlled by the porting in the plane of Figure 6 is reversed and the cycle is the same for the next four in regard to the shifting of the pair of gear clusters on the intermediate shaft, the remainder of the shifter devices being maintained in set position. For the next eight speed changes, the same cycle described up to this point or for the first eight is repeated with the exception that the shifting device moving the third gear cluster on the intermediate shaft is reversed for changing the gears at this point. When the sixteenth speed change has been reached, the shifter device controlling the shifting of the gears on the spindle shaft is reversed due to the movement of the valve past the sixteenth successive supply port in the plane controlling this shifter device. Therefore, for the next sixteen speed changes, the cycle is the same as for the first sixteen shifts with the effect that the change is accomplished solely due to the change of gear mesh on the spindle shaft.

The last speed, which is the thirty-second speed, has been fully illustrated in Figures 7 to 12 and will not be described specifically inasmuch as it is believed that it will be understood from the description given, the conditions existing being that the positions of the shifting devices 83, 99 and 109 are reversed from the positions described in reference to the high speed and the pair of shifting devices 112, 120 controlling the gear clusters on the intermediate shaft are reversed as to neutral position.

A modified form of lubricant supply means is illustrated in Figure 17. The device consists of a cylinder 150 immersed in the fluid, a piston 151 in the cylinder, a fluid supply line 152 adapted to extend from the cylinder to the control valve including a choke valve 153 opening to permit outflow upon the forward stroke of the piston and an intake port 154 also controlled by a choke valve 155 which opens to back stroke of the piston and closes to discharge or supply stroke. The piston may be hand operated by means of a lever 156 for pumping up the fluid supply in the system, or may be used to impart an impulse or high pressure at the moment that the gear shift is to be effected. Assuming the entire system to be filled compactly with fluid, the pumping of additional fluid into the same will be effective for operating the choke and relief valve in the same manner described in relation to the continuously operating pump for a high pressure impulse.

Having described our invention, we claim:

1. A hydraulic gear shifting system for changing the speed gears within a radial drill head including vertically disposed shafts for the gears; comprising, hydraulically operated shifting devices, each mounted adjacent the respective gear which it shifts, selective means for directing the hydraulic pressure to a particular shifting device, and entirely hydraulically operated locking means within each shifting device for sustaining the shifting devices in upper positions against the influence of gravity in the event of fluid failure.

2. A hydraulic gear shifting system for changing gears mounted on vertically disposed shafts, comprising, a fluid pressure means, hydraulically operated shifting plungers, each mounted adjacent the respective gears which it shifts, control means for directing the fluid pressure to a particular shifting plunger, and an entirely hydraulically operated locking detent engaging each shifting plunger for sustaining the shifting plunger in upper position in case of fluid failure.

3. In combination with a plurality of gear sets to be shifted, a fluid pump, a hydraulically operated shifting device for each set of gears, a selector valve having respective conduits extending to the various shifting devices, means for manually setting said selector valve, a supply conduit extending from the pump to said selector valve, a control valve interposed in said latter conduit, means for operating said control valve for admitting or exhausting the fluid to or from said selector valve, a fluid return conduit extending from the supply conduit to the pump, and a choke and relief valve inserted in said return conduit, said choke and relief valve adapted to build up the pressure within the supply conduit and selector valve at the time of shifting and automatically relieving the high pressure when the shifting has been accomplished.

4. In combination with a plurality of gear sets to be shifted, a fluid pump, a hydraulically operated shifting device for each set of gears, a selector valve having respective conduits extending to the various shifting devices, means for manually setting said selector valve, a supply conduit extending from the pump to said selector valve, a return conduit extending from the fluid supply conduit to the pump, and a choke and relief valve inserted in the return conduit, said choke and relief valve adapted to build up the pressure within the supply conduit and selector valve at the time of shifting and automatically relieving the high pressure when the shifting has been accomplished.

5. In a system of the class described, a gear transmission, a power shaft, a clutch for connecting said power shaft to said transmission including a lever for shifting the clutch, a fluid pump driven from said power shaft and in constant transmission connection therewith, a selector valve connected to said fluid pump, a control valve located in the connection between the pump and selector valve, means associated with the clutch control for controlling the flow of fluid to the selector valve coincidentally with the operation of the clutch, a plurality of connections extending from the selector valve, shifting devices connected to said selector valve by the aforesaid connections, said devices engaging respective slidably gears of the transmission, and a hydraulically operated detent engaging the valve element at each set position thereof for locking the same against displacement.

6. In a hydraulic gear shifting system, including, shiftable gears, a source of fluid pressure, a selector valve, a shifting device for each shiftable gear, said valve including means for positioning the valve for directing the fluid pressure flow to the desired shifting device, a fluid return line extending from the supply line, and an impedance in the return line for raising the pressure in the selector valve at the time of gear shift.

7. A hydraulic apparatus for shifting the gears of a transmission, comprising, means for placing the fluid under pressure, a supply conduit extending from said means, a control valve located in said supply conduit, a choke and relief valve located in the supply conduit beyond the control valve, two supply conduits extending between the control valve and the choke and relief valve, a selector valve located in one of said conduits, a shifting plunger for each set of shiftable gears, conduits extending from the selector valve to the respective shifting plungers, a plunger located within the choke and relief valve and moving in reverse directions depending on the application of fluid pressure through the respective conduits extending to the choke and relief valve, a resistance conduit extending from the control valve, a return conduit extending from the choke and relief valve back to the means for supplying pressure, said choke and relief valve provided with passageways alternately connecting the respective conduits extending thereto to the return passageway, whereby said control valve in one position directs the fluid flow through the selector valve to one end of the choke and relief valve for forcing the same against the slowly relieved fluid in direct connection with the resistance conduit and upon completion of the plunger stroke relieves the flow through the return passage to the means for supplying pressure, and which in its other position opens the other passageway for reversing the piston in the choke and relief valve.

8. In a hydraulic gear shifting system, a source of fluid pressure, a control valve connected to said source of pressure, a selector valve connected to said control valve, a stand pipe connected to the control valve, a plurality of shifting devices connected to said selector valve, and means for moving said control valve to alternately connect the selector valve to the fluid supply and to the stand pipe.

9. Selective gear shifting device control means, comprising, a valve body, a source of fluid supply connected to said body, a rotatable valve element in said body, a series of circumferential arrangements of conduits extending from said body to the respective shifting devices to be supplied and exhausted, said rotatable valve element having a series of ports, in connection with the supply source, arranged in planes corresponding to the planes of the discharge and supply conduits, and exhaust passageways extending longitudinally from various of said ports in the periphery of said rotatable valve element, said body including exhaust ports located in planes adjacent the planes of the ports of the body and rotatable valve element, and said rotatable valve element including a circumferential groove registering with the exhaust ports and connected to the exhaust passageways, whereby various registrations of ports and conduits may be accomplished for alternate supply and exhaust of the respective conduits.

10. A gear shifting device, comprising, a plunger carrying a shifting yoke engaging a shiftable gear, a body slidably containing said piston, a balancing piston at each end of said plunger, respective cylinders for said pistons formed in the body, said pistons of larger diameter than the plunger, a fluid connection to both cylinders at the outer ends thereof for moving the plunger to balanced or intermediate position upon application of fluid moving the pistons to the inner ends of their cylinders, and passageways to the inner ends of the respective cylinders for alternately spreading a respective piston and plunger and moving the opposite piston to the outer end of its cylinder.

11. A gear shifting device, comprising, a plunger engaging a shiftable gear, a body slidably containing said plunger, a balancing piston at each end of the plunger in the body, fluid means for engaging both pistons simultaneously against the plunger for balancing the same, and means for shifting the plunger by direct fluid application to one or the other of its respective ends coincidentally with exhaust of the balancing piston cylinders.

12. A selector valve for controlling pressure flow to hydraulically operated devices, comprising, a body, a hollow rotatable valve in said body, a fluid supply conduit connected to said body and to the periphery of said rotatable valve element, said rotatable valve element including a groove in registry with the conduit connection and a radial port extending to its interior, said valve body and rotatable element having registrable radial ports for directing the fluid pressure to the various hydraulically operated devices, a detent engaging the end of the rotatable valve element, and said fluid supply passageway connected to the rear side of the detent for forcing the same against the rotatable valve element.

13. A hydraulic gear shifting system for shifting slide gears on their shafts, comprising, a hydraulically operated shifting plunger connected to the slide gears, a fluid pressure means for said hydraulically operated plunger, and a hydraulically operated locking detent adapted to maintain the shifted plunger in shifted position in the event of fluid failure.

14. A hydraulic gear shifting system for shifting slide gears on their shafts, comprising, a hydraulically operated shifting plunger connected to the slide gears, a fluid pressure means for said shifting plunger, a locking detent adapted to maintain the shifted plunger in shifted position in the event of fluid failure, and means for releasing said locking detent coincidentally with the return movement of said shifting plunger.

GEORGE E. HIEBER.
WILLIAM G. HOELSCHER.